United States Patent [19]

Richardson

[11] Patent Number: 4,490,337

[45] Date of Patent: Dec. 25, 1984

[54] PREPARATION OF CUPRIC HYDROXIDE

[75] Inventor: Hugh W. Richardson, Houston, Tex.

[73] Assignee: Kocide Chemical Corporation, Houston, Tex.

[21] Appl. No.: 247,917

[22] Filed: Mar. 26, 1981

[51] Int. Cl.$^3$ ................................................ C01G 3/02
[52] U.S. Cl. ........................................ 423/43; 423/42; 423/604
[58] Field of Search ................... 423/42, 43, 604, 265; 424/140

[56] References Cited

U.S. PATENT DOCUMENTS

| Re. 24,324 | 5/1957 | Furness | 423/604 |
|---|---|---|---|
| 1,800,828 | 4/1931 | Furness | 423/604 |
| 1,867,357 | 7/1932 | Furness | 423/604 |
| 2,525,242 | 10/1950 | Rowe | 423/604 |
| 2,666,688 | 1/1954 | Furness | 423/604 |
| 2,924,505 | 2/1960 | Page | 423/306 |
| 3,194,749 | 7/1965 | Furness | 204/96 |
| 3,231,464 | 1/1966 | Dettwiler | 424/140 |
| 3,428,731 | 2/1969 | Furness | 424/140 |
| 3,628,920 | 12/1971 | Barker | 423/307 |
| 3,635,668 | 1/1972 | Barker | 423/604 |

OTHER PUBLICATIONS

Cocosinschi; A., in *Chemical Abstracts*, vol. 24, (1930), No. 2074.
Drozhinin; I., et al., in *Chemical Abstracts*, vol. 66, (1967), No. 6080u.
Mellor, *Inorganic and Theoretical Chemistry;* Longman, Greens, N.Y., (1923), pp. 142–146; 267–278.

*Primary Examiner*—Gary P. Straub
*Assistant Examiner*—Robert L. Stoll
*Attorney, Agent, or Firm*—Kenneth H. Johnson

[57] ABSTRACT

A method for producing finely divided stable cupric hydroxide comprising contacting solutions of an alkali metal carbonate or bicarbonate and a copper salt, precipitating a copper carbonate, contacting the precipitate with an alkali metal hydroxide and converting the copper carbonate to cupric hydroxide and re-forming alkali metal carbonate and repeating the sequence of additions of copper salt and alkali hydroxide for up to 20 cycles without addition of any additional alkali metal carbonate or bicarbonate.

22 Claims, No Drawings

PREPARATION OF CUPRIC HYDROXIDE

BACKGROUND OF THE INVENTION

1. Field of the Invention

The present invention relates to a method for producing chemically and color stable cupric hydroxide, suitable for use as a fungicide and as a chemical intermediate. In particular, the method employs a class of carbonate compounds as intermediates and may be characterized as carbonate process cupric hydroxide.

2. Related Art

Cupric hydroxide, depending to a large extent on its method of production may not be a stable material. For example, when a base, such as sodium hydroxide, is added to a solution of water soluble copper salts, e.g., copper sulfate, a blue, gelatinous precipitate is found that gradually turns black in color. This material is unstable and contains cupric oxide hydrate and cupric oxide in addition to cupric hydroxide.

U.S. Pat. No. Re. 24,324 disclosed a method for the preparation of stable cupric hydroxide. This procedure comprised reacting substantially equal molar amounts of copper sulfate and trisodium phosphate, to obtain a copper containing precipitate. The precipitate is then treated with sodium hydroxide in an amount sufficient to convert a major portion of the precipitate to cupric hydroxide. The sodium hydroxide regenerates the trisodium phosphate. The process is continued by alternately adding copper sulfate and sodium hydroxide. The trisodium phosphate is an intermediate and the alternating additions may be repeated 15 to 20 times in this manner.

A solid product is obtained by separating solids, washing and drying them.

Other methods of preparing phosphate-process cupric hydroxide are disclosed in U.S. Pat. Nos. 2,924,505 and 3,628,920.

A particularly effective fungicidal and bactericidal copper material is disclosed in U.S. Pat. No. 3,428,731 wherein stable dispersion of phosphate-process cupric hydroxide are obtained in an aqueous medium by having a pH in the range of about 7 to about 9.5.

This phosphate stabilized cupric hydroxide is suitable for use as a fungicide because of its fine particle size and high surface area, but is not suitable for most industrial applications because of the phosphate ion which has been incorporated in the final product and the resulting insolubles that are found in the reaction medium.

Another approach to producing stable cupric hydroxide is the ammonia-process cupric hydroxide, disclosed in U.S. Pat. Nos. 1,800,828; 1,867,357; 2,525,242; and 3,635,668. These materials are suitable for use as chemical intermediates, however, the individual particles are relatively course and exhibit varying degrees of fungicidal activity. The ammoniacal process also tends to produce cupric hydroxide of higher bulk density and lower surface area than the present method, hence lower reactivity per unit time compared to the present carbonate process cupric hydroxide.

However, inherent in an ammoniacal process is the problem of further processing the effluent, a problem which also exists in the phosphate processes, since both of the waste water materials may not be appropriate materials for discharge. For example, in the so called "bug ponds" where waste water is treated, ammonia may be a biological poison, which damages the effectiveness of the bacteria in the pond, whereas the phosphate may enhance undesirable algae growth. The ammoniacal process is further complicated in waste water treatment in that ammonia solubilizes the cupric hydroxide to a significant extent, thus further contaminating the waste water with copper and reducing the copper content of the product.

Phosphate-process cupric hydroxide does not present a problem in regard to copper solubility, but the phosphate may interfere with the surface properties (phosphates are surfactants) with respect to coagulation and flocculation in waste water treatment.

A disadvantage of the cupric carbonate as an industrial (chemical) intermediate (where a basis is required) is excessive foaming of the reaction medium, necessitating careful control of the copper compound addition. The carbonate process cupric hydroxide of the present invention give rise to little or no foaming and in fact, the slight effervescing of the present cupric hydroxide particles due to occluded carbonate serves to increase the reaction rates due to the so called "exploding" effect in the particles which serves to further divide and disperse the particles.

The present method has a significant advantage over the related art in that neither ammonia, copper nor phosphate are introduced into waste water. Another advantage is the presence of carbonate in the waste water, which is a practiced and accepted method of buffering industrial effluents. A feature of the present invention is absence of pollutants in the waste water stream. Another advantage of the present method is the production of the fine particles of low bulk density and high surface area. A further advantage is the use of aqueous dispersions of the carbonate process cupric hydroxide directly as foliage sprays without stickers (adhesive aids, such as starch). A further advantage of the product of the present method is its use as an intermediate in the production of various industrial copper chemicals such as copper acetates, formates, naphthenates and the like.

A particular feature of the use of the carbonate process cupric hydroxide as a chemical intermediate is the excellent reaction rates from high surface area and low foaming.

SUMMARY OF THE INVENTION

The present invention relates to the method of producing stable cupric hydroxide and the product produced, which is suitable for use as an agricultural fungicide, as a chemical intermediate and other industrial applications. The present invention provides for the production of chemically stable and color stable cupric hydroxide by use of an active intermediate, which may be regenerated in a stepwise process. The present method consists of a process whereby an initial quantity of a solution of alkali metal carbonate or bicarbonate is contacted with a solution of a soluble copper salt to form an insoluble copper carbonate intermediate. The insoluble carbonate intermediate is then treated with an alkali metal hydroxide to form insoluble cupric hydroxide and to regenerate alkali metal carbonate. The reaction is carried on in an aqueous medium.

The cupric hydroxide may be recovered at this point, however, it is preferable that the steps be repeated, for example 15 to 20 times, to produce a more substantial yield of cupric hydroxide in a single batch. This reflects an optimum production economy and also with the greater number of cycles, the physical handling properties of the material are improved.

Generally the amount of alkali metal carbonate or bicarbonate present is that amount sufficient to precipitate substantially all of the copper ions present.

The alkali metal hydroxide would normally be employed in substantially a stoichiometric amount to convert all of the copper carbonate precipitate to cupric hydroxide and to regenerate the carbonate. The bicarbonate is in effect used to generate the carbonate in situ and the addition of the alkali metal hydroxide will regenerate a carbonate whether the starting material was a carbonate or bicarbonate.

The present process would be carried out in each cycle, with 0.66 to 2 moles of alkali metal carbonate or bicarbonate per mole of copper present and 1.5 to 2 moles of alkali metal hydroxide per mole of copper present. These ratios apply through the cycles except the last cycle in, for example, a 15 cycle operation where a lesser amount of alkali metal hydroxide may be used thereby keeping the pH in the preferred range. In the last cycle approximately one mole of alkali metal hydroxide is preferably used.

The temperature of reaction would be generally in the range of 5° C. to 32° C., preferably about 20° C. to 31° C. It has been found that lower reaction temperatures produce finer product with greater surface area. Cupric hydroxide having bulk density of 8-15 pounds per cubic foot has been produced using this variable.

DETAILED DESCRIPTION OF THE INVENTION

The alkali metal carbonates and bicarbonates include Na, K, Li and Rb, although Na and K are the most preferred because of availability and ease of use. Some specific soluble carbonates and bicarbonates are sodium carbonate, sodium carbonate monohydrate, sodium carbonate, decahydrate, sodium carbonate heptahydrate, sodium hydrogen carbonate (sodium bicarbonate); potassium carbonate, potassium carbonate dihydrate potassium hydrogen carbonate, potassium carbonate trihydrate, lithium carbonate, lithium bicarbonate, rubidium carbonate, and rubidium carbonate acid.

The alkali hydroxides are preferably those of sodium, potassium, lithium and rubidium and more preferably sodium and potassium hydroxide.

The various carbonates, bicarbonates and hydroxides can be used with one cation, e.g., sodium or in mixtures.

Any soluble copper salt such as copper (II) sulfate, copper (II) chlorate, copper (II) chloride, copper (II) nitrate, trihydrate, copper (II) nitrate hexahydrate, copper (II) sulfate pentahydrate, copper (II) chloride dihydrate and the like can be employed.

The process may be carried out by dissolving 70 to 150 parts of the alkali metal carbonate or bicarbonate, such as sodium carbonate monohydrate (soda ash) in water. To this solution is added a solution of a soluble copper salt composed of approximately 63.5 parts as cupric ion in 750 to 10,000 parts of water, the molar concentration is not critical. The insoluble carbonate intermediate which forms immediately upon addition of the cupric solution to the carbonate solution is then treated with a solution containing 6 to 20 gms/100 gms water of alkali hydroxide such as sodium hydroxide, the total amount of basic solution which is added thus containing approximately 34 parts of hydroxide or, approximately 80 parts of sodium hydroxide. The insoluble color-stable cupric hydroxide is formed with concurrent release of the sodium carbonate back into solution.

As noted above, the bicarbonate is employed to generate the carbonate in situ. This is obtained by adding a sufficient amount of an alkali metal hydroxide concurrently with the bicarbonate to produce a pH equivalent to that produced by an amount of carbonate used in place of the bicarbonate, which is substantially about 1 mole of alkali metal hydroxide per mole of bicarbonate.

The solution of soluble copper salt is preferably added such that the molar ratio of copper to carbonate is approximately 1:0.7-1.2, whereby an initial active intermediate is formed which is insoluble and which is immediately precipitated on addition of the copper solution to the reaction. The alkali hydroxide is preferably added in approximately a 2:1 molar ratio relative to the copper.

This cupric hydroxide slurry is then subjected to another equivalent amount of cupric solution (as above) to regenerate the intermediate carbonate material. A sodium hydroxide solution (as above) is again added and an additional equivalent of cupric hydroxide is formed. The cyclic addition of cupric ion and sodium hydroxide can be repeated up to around twenty times and can still give rise to a color stable copper hydroxide product. At no time during the course of the reaction should the pH of the reaction medium be allowed to exceed 12.5 and preferably no higher than about 12.0. The greater the number of repetitions the more significant it is not to allow the pH to exceed 12.5, during approximately the last ten cycles of the reaction. The temperature of the reaction medium must be kept at or below around 32° C. or the cupric hydroxide in the slurry begins to decompose to the oxide and water.

As a procedural precaution the alkali metal hydroxide should be added to the precipitated copper carbonate intermediate as quickly as possible, since on standing the copper carbonate converts to malachite, which is stable and will not readily react with alkali metal hydroxide to produce cupric hydroxide.

The insoluble cupric hydroxide is formed and the alkali metal carbonate is released into solution, and is capable of reacting with another portion of the copper solution, equivalent to the initial amount added, and with the active intermediate again being formed.

It should be noted that the temperature and pH are interrelated in that, at higher temperatures, the pH control becomes more critical and should not be allowed to exceed 12.0, preferably not greater than 11.5, during the latter cycles of the reaction. High reaction temperatures and high pH result in unstable copper hydroxide. Virtually quantitative recovery of the copper results when the final pH of the slurry is kept between approximately 7.5 and 11.5, preferably 8.5 to 9.5. On completion of the reaction, i.e., between 5 and 20 additional cycles, the product may be separated by conventional methods, decantation or vacuum filtration being preferred. The product is washed to remove soluble salts, e.g., sodium sulfate and sodium carbonate salts and is then dried at 70° C. The finished product is found to be comprised of approximately 56-61% cupric ion, 1-4% anion, 0.8-3% carbonate ion, and 0.5-5% water.

An advantage of using a cyclic process is that as many as 20 equivalents of stable copper hydroxide can be formed per 0.7-1.2 equivalents of carbonate added. The maximum number of allowed cycles, up to twenty for any one reactor, can be determined by the temperature of the reactor. The temperature of the reaction medium is not allowed to exceed 32° C. or decomposition of the slurry may occur. The overall concentrations of the reactants give rise to insignificant differences in the final product. The temperature of the reaction can easily be maintained at less than 32° C. with the reactant's initial temperatures at around 20°-21° C. and with copper and alkali hydroxide solutions sufficiently dilute, e.g., 10 to 30 grams of copper per liter and two to four grams of hydroxide ion per liter of solution. However, for optimum production efficiency, a more concentrated final slurry of copper hydroxide is desired and it is found that the copper ion in solution should be closer to 60 to 90 grams per liter and the hydroxide ion concentration should be around 25 to 85 gms per liter. The carbonate or bicarbonate solution can be made up so that it is near saturation at 20° C. provided enough solution volume is present to permit agitation in the reactor. At these concentrations, if the initial reactant solutions are at approximately 20°-21° C., 15-20 cycles are easily attainable without exceeding the upper temperature limit. For a 15-20 cycle reaction, the upper pH limit of the solution should not be allowed to exceed 12.5 during the earliest cycles of the reaction and it generally should not exceed approximately 11.5 during the latter cycles, after approximately the tenth cycle.

If the slurry is allowed to remain in the reaction at 25° C., the stability of the product is vastly dependent on the pH of the medium. A pH of around 7.5-9.5 is judged best for producing slurries.

The product that results at around pH=9 was judged to be most suitable with respect to slurry stability and overall product purity. The final pH of the solution, being within the range 7.5-11.8, was found to be of minor importance in establishing the overall physical characteristics of the particle, but it was found that increasing the pH gave rise to higher copper assays, lower anions, e.g., sulfates and slightly lower carbonates in the final copper hydroxide. What is of importance from a production standpoint is that the greater the number of cycles, the better the physical handling properties of the material. The syneresis of the product in the slurry is proportional to the number of cycles, which facilitates decanting and speed of processing. Filtration was also shown to be facilitated by increased number of cycles. The overall syneresis and relative filterability of a typical run are shown in Table I. The materials used were sodium carbonate, copper sulfate and sodium hydroxide.

TABLE I

| Cycles | % Syneresis | Relative Filtering Times |
|---|---|---|
| 5 | 16.4 | 1.0 |
| 7 | 26.0 | 0.9 |
| 10 | 36.2 | 0.8 |
| 12 | 45.1 | 0.7 |
| 15 | 50.6 | 0.5 |
| 17 | 53.8 | 0.4 |
| 20 | 55.6 | 0.4 |

The invention can be illustrated more fully with respect to the following examples, which are not intended to limit the scope of the invention.

EXAMPLE 1

A cupric sulfate solution containing 63.5 grams of copper per liter (1.0M) is prepared by dissolving 1.0 kg of cupric sulfate pentahydrate in water and diluting to 4.0 liters. A sodium hydroxide solution (14%) is prepared by adding 160 grams of caustic to water and diluting to 2.0 liters to give a four molar solution. The caustic solution is allowed to cool to ambient temperature before proceeding with the reaction. To an eight liter stainless steel reactor is added 25 grams of soda ash, (sodium carbonate monohydrate 0.2 moles), in sufficient water, (approximately 300 ml) to allow agitation of the aqueous medium. Two hundred ml. of the copper solution (0.2 moles), as prepared above, is slowly added to the reactor and the intermediate is immediately precipitated. Sodium hydroxide, (100 ml of a 4.0 molar solution) is then added to the reactor to form copper hydroxide from the intermediate. The sodium carbonate is then available to form another intermediate with an additional 200 ml of the copper sulfate solution which is then added to the reactor. Again sodium hydroxide is added to form another equivalent of copper hydroxide. The process was continued with alternate additions of copper sulfate and sodium hydroxide until twenty equivalents (based on soda ash as one equivalent) of copper hydroxide were formed. Table II illustrates the pH and temperature after each cycle. After the twentieth cycle the slurry was filtered under vacuum conditions and washed with 10 liters of water. The product was transferred to an oven and dried at 60° C. for ten hours. The copper was recovered quantitatively with the dried product containing 59.0% copper. The agglomerate size was 1.9 μm. and the particles had a bulk density of 13 pounds per cubic foot. X-ray powder diffraction data indicate a highly amorphous particle with no sharply defined structure in the spectrum.

TABLE II

| Initial Soda Ash addition pH = 11.1 Temp (°C.) = 23° | | | |
|---|---|---|---|
| Cycle | pHCu[1] | pHOH[2] | T(°C.) |
| 1 | 7.8 | 12.2 | 24 |
| 2 | 9.0 | 12.2 | 25 |
| 3 | 8.8 | 12.1 | 26 |
| 4 | 8.9 | 12.0 | 26 |
| 5 | 8.7 | 11.9 | 27 |
| 6 | 8.5 | 11.9 | 27 |
| 7 | 9.0 | 11.7 | 28 |
| 8 | 8.9 | 11.7 | 28 |
| 9 | 9.0 | 11.7 | 28 |
| 10 | 9.0 | 11.6 | 29 |
| 11 | 9.0 | 11.4 | 29 |
| 12 | 8.5 | 11.5 | 30 |
| 13 | 8.7 | 11.5 | 30 |
| 14 | 8.6 | 11.5 | 30 |
| 15 | 8.6 | 11.5 | 30 |
| 16 | 8.6 | 11.5 | 31 |
| 17 | 8.5 | 11.5 | 31 |
| 18 | 8.5 | 11.5 | 31 |
| 19 | 8.5 | 11.4 | 32 |
| 20 | 8.5 | 11.4 | 32 |

[1]After Cu solution addition.
[2]After hydroxide solution addition.

EXAMPLE 2

Five Hundred and seventy grams of $Cu(NO_3)_2.2.5-H_2O$ (typically designated as copper (II) nitrate trihydrate) was dissolved in water and diluted to 2.0 liters to give 1.25 molar copper nitrate solution. An 18% sodium hydroxide solution was prepared by dissolving 2.5 grams sodium hydroxide in water and diluting to 1.0 liter. The caustic solution was allowed to cool to room temperature before using in the reaction that follows. Sodium bicarbonate, 8.4 grams, 0.1 mole, was added to a three liter reactor and was dissolved in 0.25 liter of water to allow for agitation. The pH of the bicarbonate solution was raised to 11.5 with sodium hydroxide. (This prevents carbon dioxide formation on addition of the relatively acidic cupric nitrate solution due to lowering the pH below about 6). The aqueous carbonate medium is agitated and an aliquot of the copper nitrate solution (80.1 ml, 0.1 moles) is added. The resulting intermediate which forms immediately is then converted to the hydroxide by the addition of approximately 37 ml of the above caustic solution. After sixteen cupric nitrate-sodium hydroxide cycles the temperature of the slurry had reached 32° C. with a pH of 10.1 The solution was then filtered under vacuum conditions and washed with water. The copper assay was 56.59% after drying for five hours at 65° C. The copper was recovered quantitatively.

EXAMPLE 3

Two hundred pounds of soda ash was added to a 5000 gallon reactor and dissolved in 600 gallons of water with agitation. 148 gallons of a cupric sulfate solution (21° C.) that contained 76.2 grams copper per liter was added to the reactor to form the intermediate. Seventy gallons of an 18% solution of sodium hydroxide (21° C.) was then added to the reactor to form an equivalent of cupric hydroxide. The mole ratio of hydroxide to copper was 1.9/1. The copper sulfate-sodium hydroxide cyclic additions were repeated fourteen times at which time the temperature of the reactor was 32° C. The final pH was adjusted down to 9.1 with excess cupric sulfate to lengthen slurry stability. The slurry was then filtered over vacuum, washed with water and dried at 70° C. Reaction and product data are shown in Table III.

TABLE III

| End of Cycle # | pH |
|---|---|
| 5 | 12.2 |
| 10 | 11.8 |
| 15 | 10.9 |
| Bulk Density: 11.9 Pounds per cubic foot | |
| X-ray: amorphous, typical $Cu(OH)_2$ | |
| % Copper: 59.6 | |
| Particle Size: 1.8 μm | |
| Surface area: 25.0 m/g | |
| % $SO_4$ | 1.2 |
| % $CO_3$ | 0.8 |
| % $H_2O$ | 3.3 |

The particles that result from the above examples are characterized by their fine particle size, low bulk densities and high surface areas.

The invention claimed is:

1. The method of producing stable cupric hydroxide comprising the steps of:
   (a) contacting a soluble alkali metal carbonate or bicarbonate with a soluble copper salt in an aqueous medium to form insoluble active copper carbonate,
   (b) contacting said aqueous medium containing insoluble active carbonate copper with an alkali metal hydroxide to form insoluble cupric hydroxide and soluble alkali metal carbonate.

2. The method according to claim 1 wherein after step (b), step (a) is repeated, and the steps repeated thereafter a determinate number of times.

3. The method according to claim 1 or 2 wherein the alkali metal for said carbonate or bicarbonate and said hydroxide are independently selected from sodium, potassium, lithium or rubidium.

4. The method according to claim 3 wherein said alkali metal is sodium or potassium.

5. The method according to claim 3 wherein the alkali metal is the same for the carbonate or bicarbonate and the hydroxide.

6. The method according to claim 1, 2 or 3 wherein a soluble alkali metal carbonate is used.

7. The method according to claim 1, 2 or 3 wherein a soluble alkali metal bicarbonate is used.

8. The method according to claim 1 wherein said copper salt is copper sulfate.

9. The process according to claim 1 wherein said aqueous medium contains from 70 to 150 parts of alkali metal carbonate of bicarbonate, about 63.5 parts cupric ion and about 34 parts of hydroxide.

10. The process according to claim 6 wherein the molar ratio of copper to carbonate is about 1:0.66 to 2 and the molar ratio of alkali hydroxide to copper is about 1.5 to 2:1.

11. The method according to claim 1 wherein the pH of the aqueous medium is not greater than 12.5.

12. The method according to claim 11 wherein the pH of the aqueous medium is not greater than 11.5.

13. The method according to claim 1 wherein said alkali metal carbonate or bicarbonate is present in amounts to precipitate substantially all of the copper ions present and a substantially stoichiometric amount of alkali metal hydroxide is added to convert said insoluble copper carbonate or bicarbonate to cupric hydroxide.

14. The method according to claim 7 wherein a sufficient amount of alkali metal hydroxide is added concurrent with said bicarbonate to raise the pH of the aqueous medium to that produced by an equivalent amount of alkali metal carbonate.

15. The method according to claim 7 wherein about 1 mole of alkali metal hydroxide per mole of said bicarbonate is added concurrently with said bicarbonate.

16. The method according to claim 1 or 2 wherein the temperature of the reaction medium is less than 32° C.

17. The method according to claim 16 wherein the temperature of the reaction medium is in the range of 5° to 32° C.

18. A cyclic process for preparing cupric hydroxide comprising:
   (a) contacting sodium carbonate with copper sulfate in a mole ratio of 0.66 to 2:1 in an aqueous medium,
   (b) producing an insoluble active copper carbonate,
   (c) contacting the insoluble active copper carbonate with sodium hydroxide in a mole ratio of 1:1 to 2 in said aqueous medium to produce finely divided cupric hydroxide and regenerate said sodium carbonate,
   (d) repeating steps (a) through (c) a determinate number of times, provided the temperature of the liquid medium is maintained in a range of 5° C. to 32° C. and the pH is in the range of 7.5 to 12.

19. The cyclic process according to claim 18 wherein the mole ratio of insoluble active copper carbonate to sodium hydroxide is in the range of 1:1.5 to 2 for each cycle except the last cycle where the ratio is about 1:1.

20. The cyclic process according to claim 18 or 19 wherein the temperature is in the range of 20° C. to 31° C. and the pH is in the range of 7.5 to 11.5.

21. The cyclic process according to claim 20 wherein the pH of the last cycle is 8.5 to 9.5.

22. The cyclic process according to claim 18 wherein cupric hydroxide is recovered after completion of said determinate number of cycles and dried.

* * * * *